United States Patent
Pickard et al.

(10) Patent No.: US 7,305,080 B2
(45) Date of Patent: Dec. 4, 2007

(54) METHOD, SYSTEM AND MEDIUM FOR PLUG-AND-PLAY DOWNLOADING OF SPEED DIAL LISTS

(75) Inventors: Michael Steven Pickard, Highland Park, IL (US); Edmond W. Israelski, Lake Barrington, IL (US); Donald Bernard Liebrecht, West Dundee, IL (US); Karen Jeanne Pelletier, LaQuinta, CA (US)

(73) Assignee: SBC Properties, L.P., Reno, NV (US)

( * ) Notice: Subject to any disclaimer, the term of this patent is extended or adjusted under 35 U.S.C. 154(b) by 0 days.

(21) Appl. No.: 10/664,049

(22) Filed: Sep. 15, 2003

(65) Prior Publication Data

US 2004/0120496 A1 Jun. 24, 2004

Related U.S. Application Data

(63) Continuation of application No. 09/643,113, filed on Aug. 21, 2000, now Pat. No. 6,678,367.

(51) Int. Cl.
*H04M 3/42* (2006.01)

(52) U.S. Cl. .............................. 379/216.01; 379/201.05

(58) Field of Classification Search ........... 379/216.01, 379/355.01, 218.01, 355.02–355.07, 201.01, 379/201.05
See application file for complete search history.

(56) References Cited

U.S. PATENT DOCUMENTS

| | | | | |
|---|---|---|---|---|
| 4,899,373 A | * | 2/1990 | Lee et al. .............. | 379/201.05 |
| 5,206,899 A | * | 4/1993 | Gupta et al. ................ | 379/120 |
| 5,325,424 A | | 6/1994 | Grube | |
| 5,513,256 A | | 4/1996 | Komuro | |
| 5,577,110 A | | 11/1996 | Aquino | |
| 5,583,925 A | | 12/1996 | Bernstein | |
| 5,600,643 A | | 2/1997 | Robrock, II | |
| 5,703,942 A | | 12/1997 | Pinard et al. | |
| 5,717,738 A | * | 2/1998 | Gammel ................ | 379/88.03 |
| 5,757,891 A | | 5/1998 | Wang | |
| 5,771,279 A | | 6/1998 | Cheston, III et al. | |
| 5,850,435 A | | 12/1998 | Devillier | |
| 5,883,944 A | | 3/1999 | Burke et al. | |
| 5,887,054 A | | 3/1999 | Burke et al. | |
| 5,930,350 A | | 7/1999 | Johnson | |
| 6,018,568 A | | 1/2000 | Furman et al. | |
| 6,078,653 A | | 6/2000 | Jean-Claude et al. | |
| 6,167,255 A | | 12/2000 | Kennedy, III et al. | |
| 6,269,155 B1 | | 7/2001 | Dennert | |
| 6,396,531 B1 | * | 5/2002 | Gerszberg et al. ....... | 348/14.01 |
| 6,418,213 B1 | | 7/2002 | Hornung | |
| 6,658,455 B1 | * | 12/2003 | Weinman, Jr. .............. | 709/203 |

(Continued)

*Primary Examiner*—William J. Deane, Jr.
(74) *Attorney, Agent, or Firm*—Brinks Hofer Gilson & Lione

(57) ABSTRACT

A speed dial list associated with a telephone line is received via at least one of a computer network and a telephone network. The speed dial list is stored in a database and associated with an identifier of the telephone line. An event of connecting a telephone set to the telephone line is detected. Based on the event, the telephone line to which the telephone set has been connected is identified. The speed dial list associated with the identified telephone line is retrieved. A machine-readable form of the speed dial list is communicated to the telephone set via the telephone network.

19 Claims, 2 Drawing Sheets

U.S. PATENT DOCUMENTS 6,678,367 B1    1/2004  Pickard et al.
6,839,420 B1 *  1/2005  Koponen .................... 379/219

2001/0036159 A1 *  11/2001  Katz et al.

* cited by examiner

METHOD, SYSTEM AND MEDIUM FOR PLUG-AND-PLAY DOWNLOADING OF SPEED DIAL LISTS

This application is a continuation of application Ser. No. 09/643,113, filed Aug. 21, 2000, now U.S. Pat. No. 6,678,367 which is hereby incorporated by reference.

TECHNICAL FIELD

The present invention relates to telephone speed dial lists and features.

BACKGROUND OF THE INVENTION

When a customer buys a new telephone set having data storage capabilities, it is left as a manual exercise for the customer to load information into the telephone set. For example, after a customer buys a telephone set having a speed dialing capability, the customer is left to manually load a speed dial list into the telephone set.

Other speed dialing lists are maintained within a telephone network. Regardless of whether the speed dialing list is maintained within the telephone set or the telephone network, management of speed dialing lists is left as a manual responsibility of the end users.

U.S. Pat. Nos. 5,883,944 and 5,887,054 disclose plug-and-play telephone sets which communicate to each other using a peer-to-peer protocol over a control channel. A resulting telephone system is self-configurable, meaning that each telephone set and/or adjunct bids for use of a system resource. These patents explicitly disclose that there is no centralized processing or control point to provide the plug-and-play functionality.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE PREFERRED EMBODIMENT

Embodiments of the present invention provide a telephone network plug-and-play service which uses a centralized processor and database. Briefly, the telephone network plug-and-play service detects a new network-capable device, such as a telephone set, about as soon as it is plugged in to a telephone line. An end user is prompted to determine if existing customization information, such as a speed dialing list, is to be downloaded into the new device. If the user answers in the affirmative, the customization information is downloaded to the new device. Further, the presence of the new device may be recorded for subsequent device management activities.

The network plug-and-play service eliminates the need for users to manually load new telephone sets with existing customization parameters. This increases the immediate utility of each new device, and promotes a richer set of features to be provided by the device.

Further, multiple devices including cellular and wireless devices can be updated to load the customization parameters, such as a speed dial list. This mitigates the need for users to manually update and coordinate each speed dial list across each of their telephone sets, each of their telephone lines, and optionally with a network-service-provider-based speed calling feature. Beneficially, the same speed dial list is uniformly provided regardless of which telephone set is used, and regardless of whether a CPE-based or a network-based speed calling feature is used.

Figure 1:
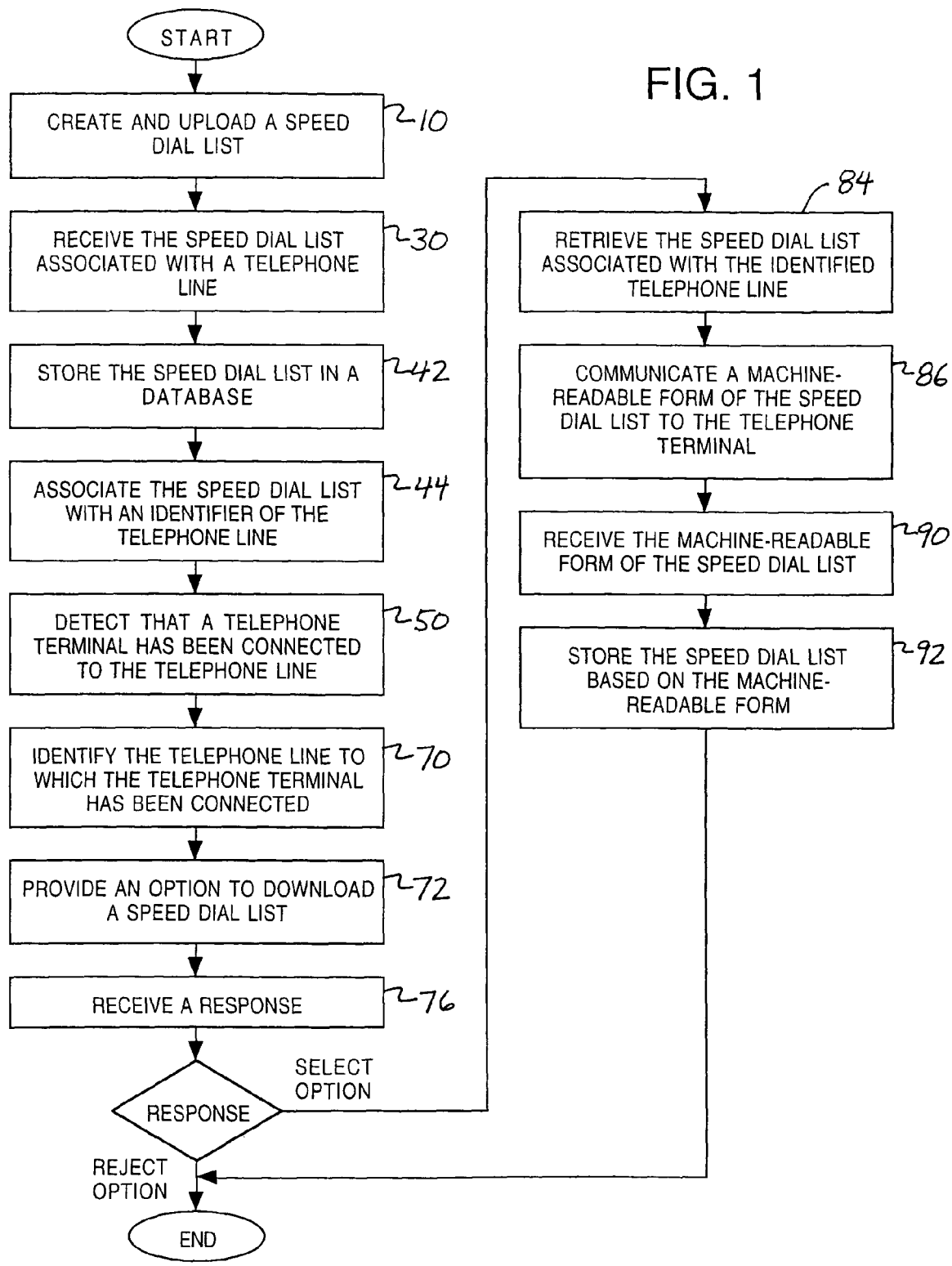
FIG. 1 is a flow chart of an embodiment of a method of plug-and-play downloading of a speed dial list.
Figure 2:
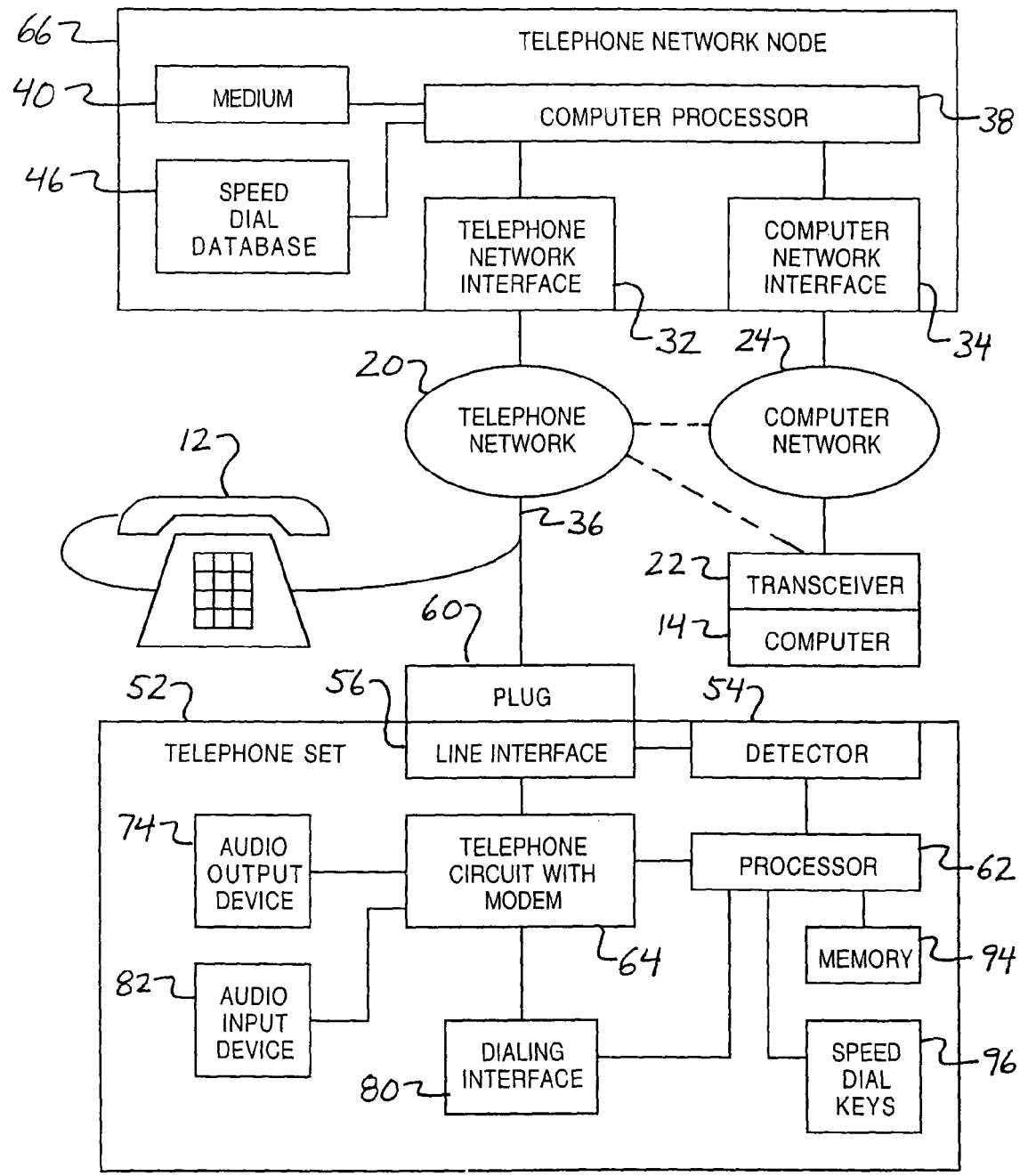
FIG. 2 is a schematic/block diagram of an embodiment of a system for plug-and-play downloading of a speed dial list.

Embodiments of the present invention are described with reference to FIG. 1, which is a flow chart of an embodiment of a method of plug-and-play downloading of a speed dial list, and FIG. 2, which is a schematic/block diagram of an embodiment of a system for plug-and-play downloading of a speed dial list. Although preferred embodiments are described with reference to speed dial lists, it is noted that the present disclosure contemplates other customization parameters which may be used either in addition to or in place of the speed dial lists. Further, although preferred embodiments are described with reference to telephone sets, it is noted that the present disclosure contemplates alternative types of customer premises equipment (CPE). Still further, although FIGS. 1 and 2 illustrate use by a single end user, the present disclosure contemplates use by a plurality of users each having his/her own unique speed dial list stored in a centralized database.

As indicated by block 10, the method comprises creating and uploading a speed dial list. The speed dial list may include an individual list of telephone numbers for business and/or personal use. The speed dial list may further include: telephone numbers used for accessing an Internet service provider (ISP) both locally and nationally, telephone numbers for accessing an intranet such as a user's business intranet via remote access services, telephone numbers for accessing information (e.g. stock quotes) via a personal digital assistant, and telephone numbers for community agencies such as police and fire departments, for example.

The speed dial list is created and uploaded by either a telephone set 12 or a computer 14. The telephone set 12 has a speed dial feature which facilitates creation and use of a speed dial list. The telephone set 12 may comprise a modem to upload the speed dial list in a machine-readable form via a telephone network 20. The telephone network 20 may comprise a public switched telephone network (PSTN), for example.

The computer 14 provides a user-friendly environment, such as a displayable form, for creating the speed dial list. Using the form, an end user may add, edit or delete entries in the speed dial list using one or more input devices such as a keyboard and a pointing device. The computer 14 includes a transceiver 22, such as a modem or a computer network interface, to upload the speed dial list in a machine-readable form via at least one of the telephone network 20 and a computer network 24. The computer network 24 may comprise the Internet or an intranet, for example.

As indicated by block 30, the method comprises receiving a speed dial list associated with a telephone line via at least one of the computer network 24 and the telephone network 20. A telephone network interface 32 is to receive the machine-readable form of the speed dial list via the telephone network 20. A computer network interface 34 is to receive the machine-readable form of the speed dial list via the computer network 24. For purposes of illustration and example, consider the speed dial list being associated with a telephone line 36. Also, consider that the telephone line 36 comprises a plain-old telephone service (POTS) line.

The telephone network interface 32 and the computer network interface 34 are coupled to a computer processor 38. The computer processor 38 either directs or assists in directing acts performed to provide plug-and-play downloading of speed dial lists. The computer processor 38 is directed by computer-readable instructions encoded on a computer-readable medium 40. The contents of the computer-readable medium 40 cause the computer processor 38 perform the herein-disclosed acts.

Examples of the computer-readable medium 40 include, but are not limited to, a computer-readable storage medium and a computer-readable communication medium. Examples of a computer-readable storage medium include, but are not limited to, an optical storage medium, an electronic storage medium, and a magnetic storage medium. The computer-readable storage medium may include stored data which encode computer program code and/or other computer-readable instructions.

Examples of a computer-readable communication medium include, but are not limited to, an optical communication medium, an electronic communication medium, and an electromagnetic communication medium. The contents of the computer-readable communication medium may include one or more waveforms which encode computer data such as computer program code and/or other computer-readable instructions.

Based on the herein-disclosed high-level description, one or more computer programs to direct the computer processor 38 to perform the method is within the skill of a routineer in the art of telecommunications.

As indicated by blocks 42 and 44, the method comprises storing the speed dial list in a database 46 and associating the speed dial list with an identifier of the telephone line 36 in the database 46. The database 46 is responsive to the computer processor 38 to perform these acts. Optionally, the uploaded speed dial list is accessible by a network-service-provider to provide a network-based speed calling feature either for the telephone line 36 or for another telephone line associated with the end user.

As indicated by block 50, the method comprises detecting that a telephone set 52 has been connected to the telephone line 36. The act of detecting may comprise receiving a telephone call automatically placed by the telephone set 52 via the telephone line 36 in response to the telephone set 52 being connected to the telephone line 36. In this case, the telephone set 52 may comprise a detector 54 which detects the telephone line 36 being connected to a line interface 56. The line interface 56 may comprise a registered jack (RJ), such as an RJ11 jack, to receive a corresponding plug 60 connected to the telephone line 36. The detector 54 may detect either an onset of the plug 60 being present in the jack, or an onset of a signal provided from the telephone line 36 via the plug 60 to the jack.

The telephone set 52 comprises a processor 62 responsive to the detector 54. The processor 62 may comprise a microprocessor, a microcontroller, or an application-specific integrated circuit, for example. The processor 62 directs a telephone circuit having a modem 64 to dial an internally-stored telephone number of a telephone network node 66 in response to detecting an onset of the telephone line 36 being connected to the line interface 56. The telephone network node 66 receives and answers the telephone call placed by the telephone circuit/modem 64. Optionally, an alert signal may be generated by the telephone set 52 to alert the end user to pick up a handset or to be otherwise prepared to interact with the telephone network node 66.

As indicated by block 70, the method comprises identifying the telephone line 36 to which the telephone set 52 has been connected. The telephone line 36 may be identified based on at least one of a calling party number and an automatic number identification associated with the telephone call.

Optionally, as indicated by block 72, the method comprises providing, within the telephone call, an option to download a speed dial list. The option may be provided by the telephone network node 66 in the form of an audible voice-synthesized or recorded, spoken message played to the end user using an audio output device 74. The audio output device 74 comprises a speaker or a like transducer to generate audible acoustic pressure waves based upon electrical signals applied thereto. A signal which carries the audible message is received from the telephone line 36, processed by the telephone circuit 64, and applied to the audio output device 74.

Optionally, as indicated by block 76, the method comprises receiving a response within the Telephone call. The response may comprise either a dialed response entered using a dialing interface 80 or a spoken response entered using an audio input device 82. The response may indicate either a selection of the option or a rejection of the option.

The dialing interface 80 may include a telephone keypad having dialing digit keys of "0" to "9", a "*" key and a "#" key. The telephone keypad directs the generation of dual-tone multi-frequency (DTMF) signals. Signals generated in response to the telephone keypad are applied to the telephone line 36 by the telephone circuit 64.

The audio input device 82 comprises a microphone or a like transducer to generate electrical signals based upon audible acoustic pressure waves sensed thereby. Signals generated by the audio input device 82 are applied to the telephone line 36 by the telephone circuit 64.

If the response indicates a selection of the option, an act of retrieving a speed dial list from the database 46 is performed, as indicated by block 84. The speed dial list associated with the telephone line 36 may be retrieved from the database 46 based on the identified telephone line described with reference to block 70. Alternatively, another speed dial list may be retrieved from the database 46 if the end user enters an appropriate identifier and password using the dialing interface 80 and/or the audio input device 82. The identifier may comprise a telephone number which identifies the other speed dial list. In this way, the end user may download a speed dial list associated with one of his/her telephone numbers to a telephone set associated with another of his/her telephone numbers.

As indicated by block 86, the method comprises communicating a machine-readable form of the speed dial list to the telephone set 52 via the telephone network 20. Preferably, the machine-readable form of the speed dial list is communicated within the telephone call.

As indicated by block 90, the method comprises receiving the machine-readable form of the speed dial list by the telephone set 52. The modem 64 receives and demodulates the machine-readable form of the speed dial list. As indicated by block 92, the method comprises storing the speed dial list in the telephone set 52 based on the machine-readable form. The processor 62 directs the speed dial list to be stored in a memory 94. Thereafter, the telephone call is terminated, and users may access the speed dial list in the telephone set 52. Users may access the speed dial list using one or more speed dial keys 96 and/or the dialing interface 80.

To illustrate how multiple devices may be updated, consider an end user modifying and uploading a speed dial list using the computer 14. The speed dial list may be downloaded to the telephone set 52 by briefly removing and replacing the plug 60 to the line interface 56. Similarly, if the telephone set 12 has the same features as the telephone set 52, the speed dial list may be downloaded to the telephone set 12 by briefly removing and replacing a plug (not specifically illustrated) to a line interface (not specifically illustrated) of the telephone set 12.

Thus, there has been described herein several embodiments including preferred embodiments of a method, system and medium for plug-and-play downloading of speed dial lists.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method comprising:
   detecting that a telephone set has been connected to a telephone line; and
   in response to the detection:
   identifying the telephone line to which the telephone set has been connected;
   retrieving a speed dial list from a database based on the identifying, wherein the speed dial list is associated in the database with the telephone line; and
   communicating the speed dial list associated with the telephone line to the telephone set.

2. The method of claim 1 wherein the detecting comprises receiving a telephone call automatically placed by the telephone set via the telephone line in response to the telephone set being connected to the telephone line.

3. The method of claim 2, wherein the telephone line to which the telephone set has been connected is identified based on at least one of a calling party number and an automatic number identification associated with the telephone call.

4. The method of claim 2 wherein the communicating is performed within the telephone call.

5. The method of claim 2 further comprising:
   providing, within the telephone call, an option to download the speed dial list; and
   receiving, within the telephone call, a selection of the option.

6. The method of claim 1 further comprising:
   storing the speed dial list in the telephone set.

7. A method comprising:
   receiving a telephone call automatically placed by a telephone set via a telephone line in response to the telephone set being connected to the telephone line;
   providing within the telephone call an option to download a speed dial list;
   receiving, within the telephone call, a selection of the option to download the speed dial list;
   communicating the speed dial list to the telephone set; and
   storing the speed dial list in the telephone set.

8. A system comprising:
   a processor to:
   detect that a telephone set has been connected to a telephone line; and
   in response to the detection:
   identify the telephone line to which the telephone set has been connected;
   retrieve a speed dial list from a database based on the identifying, wherein the speed dial list is associated in the database with the telephone line; and
   communicate the speed dial list associated with the telephone line to the telephone set.

9. The system of claim 8 wherein the processor is to detect that the telephone set has been connected to the telephone line by receiving a telephone call automatically placed by the telephone set via the telephone line in response to the telephone set being connected to the telephone line.

10. The system of claim 9 wherein the processor identifies the telephone line to which the telephone set has been connected based on at least one of a calling party number and an automatic number identification associated with the telephone call.

11. The system of claim 9 wherein the processor is to communicate the speed dial list within the telephone call.

12. The system of claim 9 wherein the processor is further to provide, within the telephone call, an option to download the speed dial list, and to receive, within the telephone call, a selection of the option.

13. A computer-readable medium having computer-readable content to cause a computer to perform acts of:
   detecting that a telephone set has been connected to a telephone line; and
   in response to the detection:
   identifying the telephone line to which the telephone set has been connected;
   retrieving a speed dial list from a database based on the identifying, wherein the speed dial list is associated in the database with the telephone line; and
   communicating the speed dial list associated with the telephone line to the telephone set.

14. The computer-readable medium of claim 13 wherein the detecting comprises receiving a telephone call automatically placed by the telephone set via the telephone line in response to the telephone set being connected to the telephone line.

15. The computer-readable medium of claim 14 wherein the telephone line to which the telephone set has been connected is identified based on at least one of a calling party number and an automatic number identification associated with the telephone call.

16. The computer-readable medium of claim 14 wherein the communicating is performed within the telephone call.

17. The computer-readable medium of claim 14 wherein the computer-readable content further causes the computer to perform acts of:
   providing, within the telephone call, an option to download the speed dial list; and
   receiving, within the telephone call, a selection of the option.

18. The computer-readable medium of claim 13 wherein the computer-readable content further causes the computer to perform an act of:
   storing the speed dial list in the telephone set.

19. The computer-readable medium of claim 13 wherein communicating the speed dial list comprises communicating a machine readable form of the speed dial list to the telephone set.

* * * * *